(12) United States Patent
Engelen et al.

(10) Patent No.: US 10,616,540 B2
(45) Date of Patent: Apr. 7, 2020

(54) LAMP CONTROL

(71) Applicant: SIGNIFY HOLDING B.V., Eindhoven (NL)

(72) Inventors: Dirk Valentinus Rene Engelen, Heusden-Zolder (BE); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 26 days.

(21) Appl. No.: 15/749,915

(22) PCT Filed: Aug. 5, 2016

(86) PCT No.: PCT/EP2016/068734
§ 371 (c)(1),
(2) Date: Feb. 2, 2018

(87) PCT Pub. No.: WO2017/021530
PCT Pub. Date: Feb. 9, 2017

(65) Prior Publication Data
US 2018/0227555 A1  Aug. 9, 2018

(30) Foreign Application Priority Data

Aug. 6, 2015  (EP) .................................. 15179932

(51) Int. Cl.
*H04N 9/31*      (2006.01)
*H05B 33/08*     (2020.01)
(Continued)

(52) U.S. Cl.
CPC ......... *H04N 9/3155* (2013.01); *G06F 3/0488* (2013.01); *G06F 3/04847* (2013.01);
(Continued)

(58) Field of Classification Search
None
See application file for complete search history.

(56) References Cited

U.S. PATENT DOCUMENTS 5,422,693 A * 6/1995 Vogeley ................ G06F 3/0386
345/158
8,322,862 B2  12/2012 Nara
(Continued)

FOREIGN PATENT DOCUMENTS

EP       2651190 A2    10/2013
KR    2008089045 A    10/2008
(Continued)

*Primary Examiner* — Samira Monshi
(74) *Attorney, Agent, or Firm* — Daniel J. Piotrowski

(57) ABSTRACT

A user device (200) comprising a display (206), an interface (208) for communication with a lamp comprising controllable light sources (104) and a processor (202) configured to run an application (214), wherein the application is configured to: control the lamp to emit light in accordance with a source light pattern (302), said source light pattern defining for each light source the light that is to be emitted by the light source and designating at least one of the light sources as a marker light source (308); receive an image of the source light pattern as projected onto a target surface (300) by the lamp wherein the image is captured by a camera (210), wherein the target light pattern (310) in the image is distorted; display the received image on the display; detect locations in the displayed image where the marker light source(s) are positioned/intended to emit light onto the target surface; and use the detected locations of marker light source(s) to align a control overlay over the displayed image, the control overlay identifying for each light source an area in the displayed image where the light source is intended to emit light onto, wherein the control overlay enables a user of the user device to control the light sources in response to at least one user selection.

15 Claims, 8 Drawing Sheets

(51) Int. Cl.
  *H05B 37/02*   (2006.01)
  *G06F 3/0484*  (2013.01)
  *G06F 3/0488*  (2013.01)
  *G06T 7/70*    (2017.01)

(52) U.S. Cl.
  CPC ............ *G06T 7/70* (2017.01); *H04N 9/3185* (2013.01); *H04N 9/3194* (2013.01); *H05B 33/0863* (2013.01); *H05B 37/0245* (2013.01); *G06T 2207/30208* (2013.01); *G08C 2201/93* (2013.01)

(56) References Cited

U.S. PATENT DOCUMENTS

| | | |
|---|---|---|
| 8,356,916 B2 | 1/2013 | Gordin et al. |
| 8,746,895 B2 | 6/2014 | Archdale |
| 8,894,239 B2 | 11/2014 | Wendt et al. |
| 2009/0051624 A1 | 2/2009 | Finney et al. |
| 2009/0102988 A1 | 4/2009 | Maeda et al. |
| 2010/0309391 A1* | 12/2010 | Plut ............ H04N 9/3117 348/756 |

FOREIGN PATENT DOCUMENTS

| | | |
|---|---|---|
| WO | 20010079400 A1 | 7/2010 |
| WO | 2013121342 A2 | 8/2013 |
| WO | 2013186684 A2 | 12/2013 |
| WO | 2014108784 A2 | 7/2014 |

\* cited by examiner

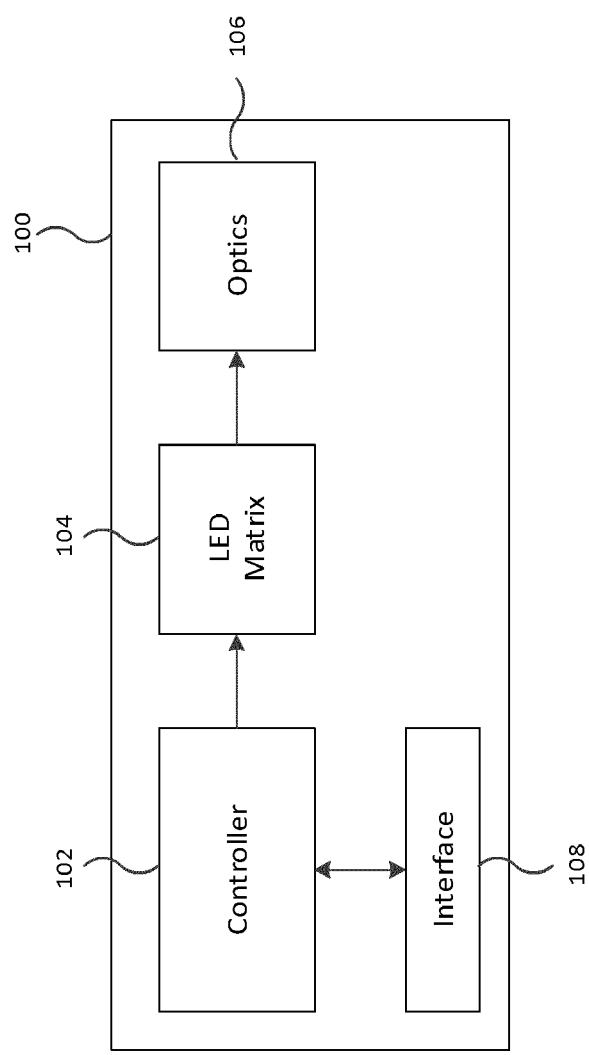

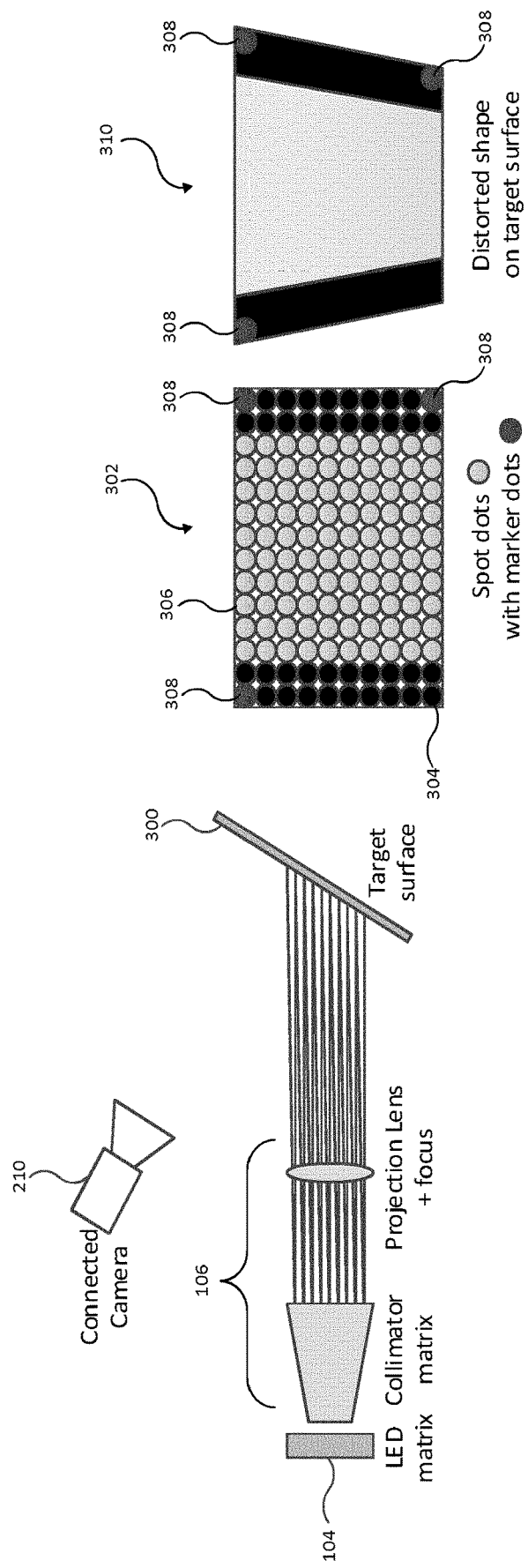

LAMP CONTROL

CROSS-REFERENCE TO PRIOR APPLICATIONS

This application is the U.S. National Phase application under 35 U.S.C. § 371 of International Application No. PCT/EP2016/068734, filed on Aug. 5, 2016 which claims the benefit of European Patent Application No. 15179932.7, filed on Aug. 6, 2015. These applications are hereby incorporated by reference herein.

BACKGROUND OF THE INVENTION

In Digital Light Processing (DLP) projectors, light is generated from a single source and reflected by a digital micro-mirror device (DMD) which comprises an array of controllable micro-mirrors. Using this principle, the light rays are created with controllable intensity. The micromirrors digitally switch the light rays through or away from the lens at a high frequency, so the intensity of the light can be changed in small steps.

A spot dot lamp (otherwise known as a pixelated spot lamp, or a matrix spotlight) can be considered as a lamp that creates a plurality of small "spots", similar to the projectors that use DMD devices. In a spot dot lamp, the functionality of the DMD for creating a matrix of light pixels is replaced by a light-emitting diode (LED) matrix of controllable LEDs (referred to as spot dots) and optics to collimate the light rays emitted by the LEDs. By switching the individual LEDs in the matrix, the light pattern generated by the spot dot lamp is controllable.

Spot dot lamps can be configured to provide any desired beam shape due to the ability for a user to individually control the light emitted from each of the LEDs, but the desired shape needs to be communicated to the lamp in some way.

In the current state of the art, the resolution of DMD devices is in the megapixel range while spot dot lamps are under the 100 pixel range, with advances in technology there is scope for this to increase.

SUMMARY OF THE INVENTION

When a spot dot lamp is not perpendicularly radiating light onto a target surface, the projection of the shape of the light pattern is distorted. The inventors have identified that as the spot dot lamp has means to correct this projected image by modulating the LEDs in the LED matrix, the desired shape can still be projected on the target surface. In the present disclosure a user of a user device is provided with a user interface to interactively configure and control a spot dot lamp.

In accordance with a first aspect of the present disclosure there is provided a user device comprising: a display; an interface for communication with a lamp comprising controllable light sources; a processor configured to run an application for controlling the lamp, wherein the application is configured to: control the lamp to emit light in accordance with a source light pattern, said source light pattern defining for each controllable light source the light that is to be emitted by the light source, and designating at least one of the controllable light sources as a marker light source; receive an image of the source light pattern that is projected onto a target surface by the lamp that is captured by a camera coupled to the processor, wherein the source light pattern in the image is distorted; display an image on the display; detect locations on the target surface in the displayed image that the at least one marker light source are positioned/intended to emit light onto; and use the detected locations to align a control overlay over the displayed image, the control overlay identifying, for each of the controllable light sources, an area in the displayed image where the light source is positioned/intended to emit light onto, wherein the control overlay enables a user of the user device to control the light sources in response to at least one user selection.

The application may be configured to control the lamp to emit light in accordance with the source light pattern by transmission of an illumination pattern to the lamp via said interface, the illumination pattern defining for each controllable light source, the light that is to be emitted by the light source.

The application may be configured to control the lamp to emit light in accordance with the source light pattern by transmission of a marker pattern to the lamp via said interface, the marker pattern designating at least one of the controllable light sources as a marker light source.

The application may be configured to receive via said interface a marker pattern transmitted from the lamp, the marker pattern generated by the lamp and designating at least one of the controllable light sources as a marker light source.

The user device may comprise a memory storing characteristics of light emitted by the at least one marker light source, and the application may be configured to detect the locations on the target surface in the displayed image that the at least one marker light source are positioned/intended to emit light onto by detecting that light incident on said locations have said characteristics.

The characteristics may comprise an identifier of the at least one marker light source that is embedded in light emitted by the at least one marker light source. The characteristics may comprise a colour of light emitted by the at least one marker light source.

The at least one marker light source may be controlled to emit coloured light, and the application may be configured to detect the locations on the target surface in the displayed image that the at least one marker light source are positioned/intended to emit light onto based on at least one input received from a user of the user device identifying the locations on the target surface in the displayed image at which the coloured light is incident on.

The displayed image may be the received image such that the displayed image comprises the distorted source light pattern, and the application may be configured to adapt the source light pattern to form the control overlay such that it is aligned over the distorted source light pattern. Alternatively, the control overlay may correspond to the source light pattern, and the application may be configured to perform image processing on the received image to generate a processed image having said distortion corrected and display the processed image such that the source light pattern is aligned over the processed image.

The application may be configured to receive a user selection of an area of the control overlay, and transmit a command via said interface to the lamp to control the light source positioned/intended to emit light onto said area.

The display may comprise a touchscreen arranged to receive said user selection.

The user device may comprise a user input device for receiving said user selection.

According to another aspect of the present disclosure there is provided a lighting system comprising the user device described herein, and the lamp described herein.

According to another aspect of the present disclosure there is provided a computer program product comprising code embodied on a computer-readable medium and being configured so as when executed on a processor of a user device comprising a display and an interface for communication with a lamp comprising controllable light sources, to: control the lamp to emit light in accordance with a source light pattern, said source light pattern defining for each controllable light source the light that is to be emitted by the light source, and designating at least one of the controllable light sources as a marker light source; receive an image of the source light pattern that is projected onto a target surface by the lamp that is captured by a camera coupled to the processor, wherein the source light pattern in the image is distorted; display an image on the display; detect locations on the target surface in the displayed image that the at least one marker light source are positioned/intended to emit light onto; and use the detected locations to align a control overlay over the displayed image, the control overlay identifying, for each of the controllable light sources, an area in the displayed image where the light source is positioned/intended to emit light onto, wherein the control overlay enables a user of the user device to control the light sources in response to at least one user selection.

In other aspects of the present disclosure there is provided a method implemented at a user device for controlling a lamp comprising controllable light sources, the method comprising one or more steps performed by the lighting control software application described herein.

In one particular aspect of the present disclosure there is provided a method implemented at a user device for controlling a lamp comprising controllable light sources, the method comprising: controlling the lamp to emit light in accordance with a source light pattern, said source light pattern defining for each controllable light source the light that is to be emitted by the light source, and designating at least one of the controllable light sources as a marker light source; receiving an image of the source light pattern that is projected onto a target surface by the lamp that is captured by a camera of the user terminal, wherein the source light pattern in the image is distorted; displaying an image on a display of the user device; detecting locations on the target surface in the displayed image that the at least one marker light source are positioned/intended to emit light onto; and using the detected locations to align a control overlay over the displayed image, the control overlay identifying, for each of the controllable light sources, an area in the displayed image where the light source is positioned/intended to emit light onto, wherein the control overlay enables a user of the user device to control the light sources in response to at least one user selection.

The may further comprise detecting the locations on the target surface in the displayed image that the at least one marker light source are positioned/intended to emit light onto by detecting that light incident on said locations have characteristics corresponding to characteristics of light emitted by the at least one marker light source stored in a memory of the user device. The characteristics may comprise an identifier of the at least one marker light source that is embedded in light emitted by the at least one marker light source or a colour of light emitted by the at least one marker light source.

The at least one marker light source may be controlled to emit coloured light, and the method may further comprise detecting the locations on the target surface in the displayed image that the at least one marker light source are positioned/intended to emit light onto based on at least one input received from a user of the user device identifying the locations on the target surface in the displayed image at which the coloured light is incident on.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which:

FIG. 1a illustrates a schematic block diagram of a lamp;

FIG. 3a illustrates an example source light pattern that comprises a marker pattern as well as an illumination pattern, and a resulting light pattern that is incident on a target surface;

DETAILED DESCRIPTION

Embodiments will now be described by way of example only.

Figure 1B:
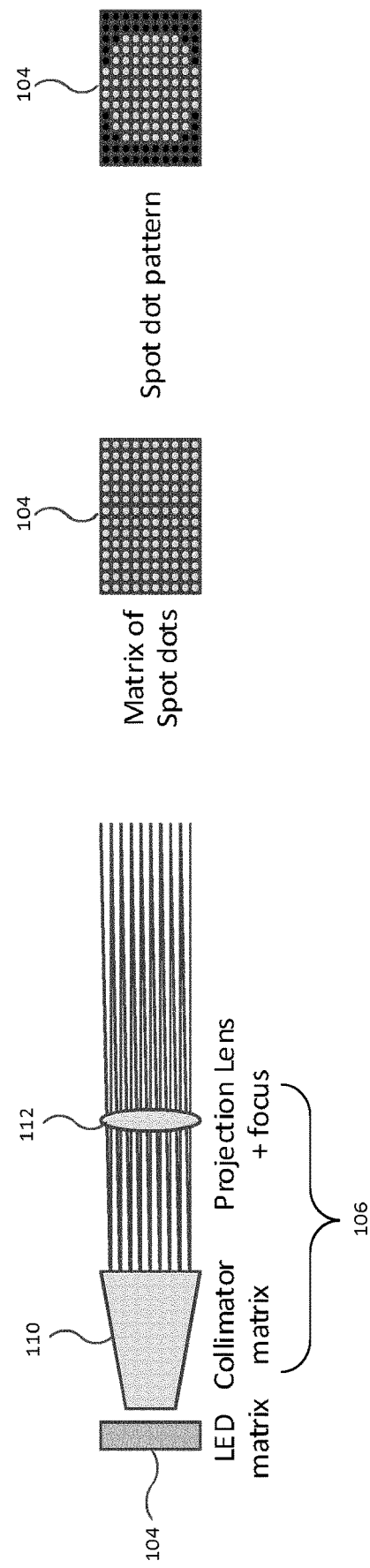
FIG. 1b illustrates example source light patterns.

Reference is first made to FIGS. 1a and 1b. FIG. 1a illustrates a schematic block diagram of a lamp 100. The lamp 100 comprises a controller 102, LED matrix 104, optics 106 and an interface 108.

The lamp 100 is configured to communicate with a user device (which will be described in further detail with reference to FIG. 2) via the interface 108.

The lamp 100 may communicate with the user device via a wireless connection, in which case the interface 108 comprises a wireless communications interface e.g. a wireless interface such as Wi-Fi, Zigbee, Bluetooth or other short-range radio frequency (RF) wireless access technology interface, or an Infra-red (IR) interface. Alternatively the lamp 100 may be configured to communicate with the user device via a wired connection, in which case the interface 108 comprises a wired communications interface. Examples of wired and wireless communication interfaces are well known to persons skilled in the art and are therefore not discussed in detail herein.

The controller 102 is configured to receive one or more control signals via the interface 108, which have been transmitted from the user device, for generating a source light pattern. In response to receiving the control signal(s), the controller 102 is configured to control the LED matrix 104 to emit light in accordance with a source light pattern. That is, the controller 102 controls which of the controllable LEDs are turned on (such that they emit light) and which controllable LEDs are turned off (such that they emit no light), furthermore the controller 102 may control other lighting characteristics of the light emitted from the LEDs e.g. colour, intensity etc. The term "source light pattern" is used herein refer to the light emitted by each of the controllable light sources of the LED matrix array 104.

The functionality of the controller 102 that is described herein may be implemented in code (software) stored on a memory (not shown in FIG. 1a) comprising one or more storage media, and arranged for execution on a processor comprising on or more processing units. The code is configured so as when fetched from the memory and executed on the processor to perform operations in line with embodiments discussed below. Alternatively it is not excluded that some or all of the functionality of the controller 102 is implemented in dedicated hardware circuitry, or configurable hardware circuitry like a field-programmable gate array (FPGA).

LED matrix array 104 comprises a plurality of controllable light sources, for example, light-emitting diodes. Whilst embodiments of the present disclosure are described with reference to the light sources being LEDs, embodiments extend to other light sources such as incandescent, halogen, fluorescent and high-intensity discharge (HID) light sources. Other controllable light sources are known to persons skilled in the art.

Light emitted from the LED matrix array 104 passes through optics 106 which projects the light into the indoor or outdoor environment of the lamp 100. As shown in FIG. 1b the optics 106 comprise a collimator matrix 110 and a lens 112. The collimator matrix 110 generates collimated lights beams which are coupled into the lens 112 which projects the collimated lights beams onto a target surface.

FIG. 1b illustrates a face-on view of the LED matrix 104 whereby all of the controllable LEDs (referred to as spot dots) are turned on, and a face-on view of the LED matrix 104 whereby the LEDs are controlled in accordance with an example light pattern such that some of the LEDs are turned on and some of the LEDs are turned off, to form a circular light effect shape.

Whilst FIG. 1b illustrates the controllable light sources of the LED matrix array 104 being arranged in a rectangle arrangement, it will be appreciated that the controllable light sources of the LED matrix array 104 may be arranged in other ways e.g. in a square arrangement.

As described above, the lamp 100 is configured to communicate with a user device.

Figure 2:
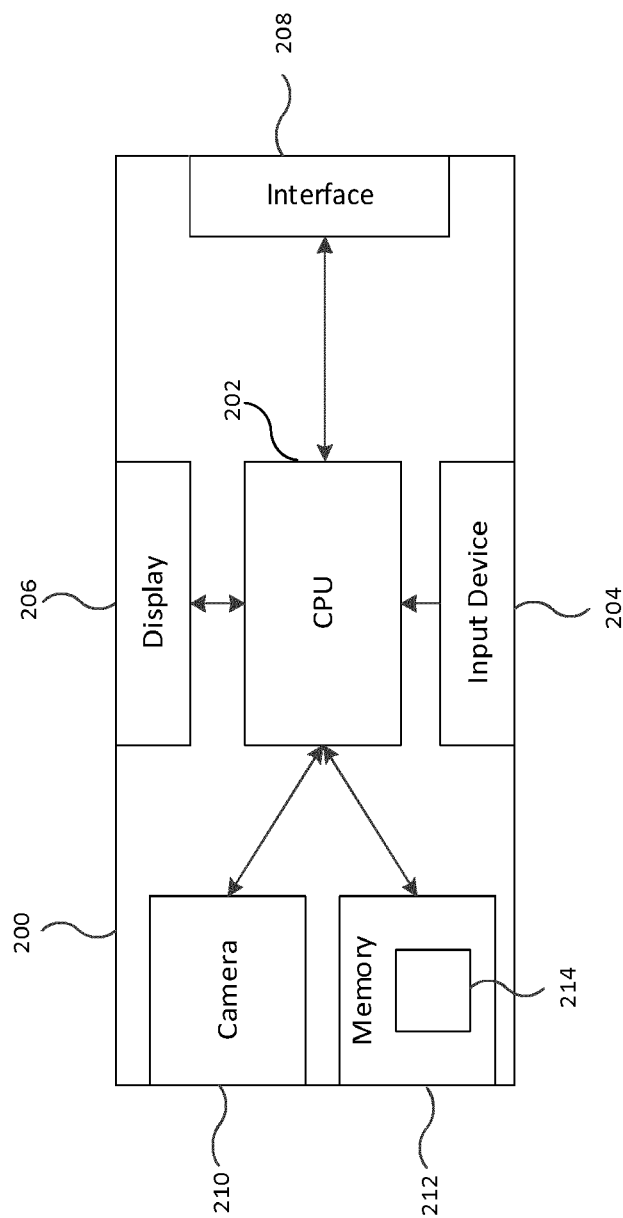
FIG. 2 illustrates a schematic block diagram of a user device.

FIG. 2 illustrates a schematic block diagram of a user device 200. The user device 200 may be for example, a mobile phone, a personal digital assistant ("PDA"), a personal computer ("PC"), a tablet computer, a gaming device etc.

The user device 200 comprises a central processing unit ("CPU") 202 to which is connected an input device 204, a display 206 such as a screen or touch screen, an interface 208, a camera 210 and a memory 212.

The input device 204 can take any suitable form and can be one or more of a keyboard, mouse, touch screen, joystick or game controller. It should be appreciated that the display 206 may in some embodiments also provide the input device 204 by way of an integrated touch screen for example.

The user device 200 is installed with a lighting control software application 214, in that the lighting control software application 214 is stored in the memory 206 and arranged for execution on the CPU 202.

The lighting control software application 214 provides a user interface which is displayed on the display 206 of the user device 200. The lighting control software application 214 presents information to, and receives information from a user of the user device 200.

As will be described in more detail below, the user interacts with the lighting control software application 214 executed on the user device 200 to individually control the LEDs in the LED matrix 104. The user may provide user inputs by making appropriate selections using the touch screen 206. Alternatively or additional the user may provide user inputs using the input device 204.

In response to receiving user inputs received from the user of the user device 200 via the input device 204, the lighting control software application 214 is configured to transmit control signals via interface 208 to the lamp 100 to control the controllable LEDs of the LED matrix 104.

The interface 208 comprises an interface suitable for communication with the lamp 100, for example a wired and/or wireless communication interface examples of which have been described above.

The camera 210 is configured to capture images in the environment of the lamp 100. In embodiments of the present disclosure, the camera 210 is used to capture an image of the source light pattern that has been projected onto a target surface by the lamp 100.

The camera 210 may be a 'rolling shutter' type camera, which often integrated into a mobile device like a mobile phone or tablet. In a rolling-shutter camera, the camera's image capture element is divided into a plurality of lines (typically horizontal lines, i.e. rows) which are exposed in sequence line-by-line. In alternative embodiments the camera 210 is a 'global shutter' type camera (where the whole pixel array of the image sensor is exposed at once). Persons skilled in the art will appreciate that coded light can be detected using both the 'rolling shutter' type camera and 'global shutter' type camera Whilst FIG. 2 illustrates the camera 210 being integrated into the user device 200, in other embodiments the camera 210 may not be integrated into the user device 200 and may be connected to the controller 202 via a wired or wireless connection using interface 208.

The user of the user device 200 is able to interact with the user interface provided by the lighting control software application 214 to select an illumination pattern that is to be emitted by the lamp 100. The selected illumination pattern defines which of the controllable LEDs of the LED matrix 104 are to be turned on, and which of the controllable LEDs of the LED matrix 104 are to be turned off (if any). The lighting control software application 214 may provide one or more predefined illumination patterns that the user may select. Alternatively or additionally, the lighting control software application 214 may enable the user to generate an illumination pattern themselves by selecting which of the controllable LEDs of the LED matrix 104 are to be turned on/off using the touch screen 206 and/or the input device 204.

The lighting control software application 214 is configured to transmit one or more control signals via the interface 208, to control the lamp 100 to generate a source light pattern in accordance with the selected illumination pattern.

FIG. 3a illustrates an example source light pattern 302 that is projected onto a target surface 300 in response to a selected illumination pattern being communicated to the lamp 100 via the interface 208.

The example source light pattern is formed by controllable LEDs (indicated by reference numeral 304) of the LED matrix 104 being turned off, and controllable LEDs (indicated by reference numeral 306) of the LED matrix 104 being turned on. As shown in FIG. 3a, the light effect of the source light pattern 302 is rectangular.

If the lamp 100 is perpendicular to the target surface the light effect will be rectangular at the surface 300 (light emitted from the lamp 100 will be projected onto a rectangular footprint on the target surface 300). However if the lamp 100 is not perpendicular to the target surface 300, the projection of this shape will be distorted. This is shown in FIG. 3a.

FIG. 3a illustrates the scenario whereby by the lamp 100 is not perpendicular to the target surface 300. The camera 210 captures an image of the target light pattern that is projected onto the target surface 300 by the lamp 100, and displayed on display 206. In the example scenario illustrated in FIG. 3a, the camera 210 is perpendicular to the target surface 300.

As a result of the position of the lamp 100 and the camera 210 with respect to the target surface 300 as described above, the light effect (which is rectangular at the source) incident on the target surface 300 will not be rectangular. That is, the light footprint on the target surface 300 (also referred to herein as the target light pattern) will appear in an image captured by camera 210 as having a distorted shape. A target light pattern 310 captured by camera 210 is shown in FIG. 3a.

Figure 3B:
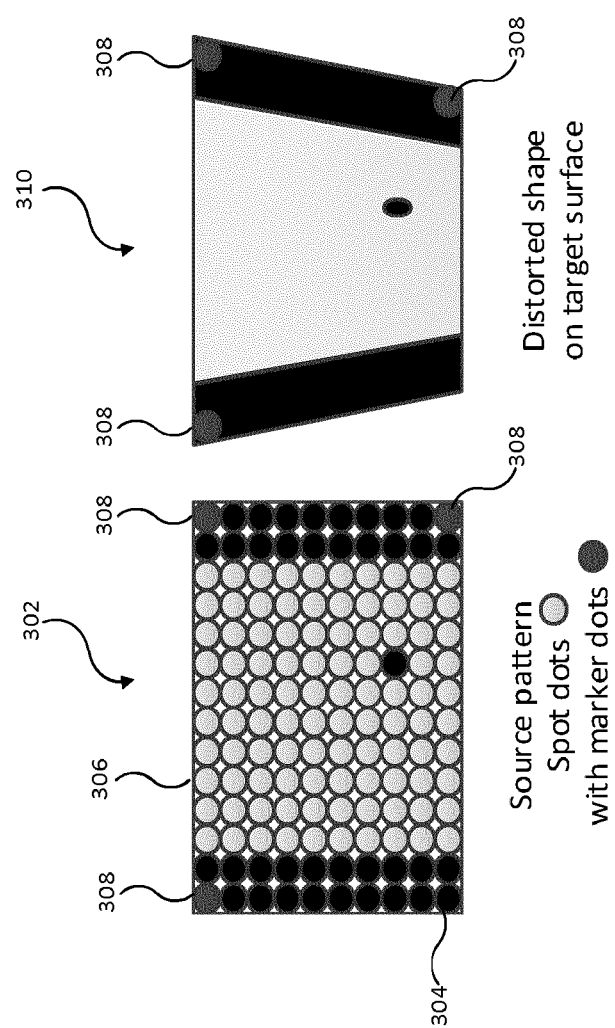
FIG. 3b illustrates a further example source light pattern that comprises a marker pattern as well as an illumination pattern, and a resulting light pattern that is incident on a target surface.

FIG. 3b illustrates the effect to the light footprint on the target surface 300 when the source light pattern 302 is adjusted such that one of the controllable LEDs that was previously turned on to emit light to provide an illumination function, is turned off.

Embodiments of the present disclosure enable the user to interact with the user interface provided by the lighting control software application 214 such that the desired shape (light footprint) can still be projected on the target surface 300.

In embodiments of the present disclosure the lamp 100 is configured to emit a source light pattern that comprises a marker pattern as well as an illumination pattern (received from the user device 200). As will be described in more detail below, this marker pattern allows aligning of a control overlay over a captured image displayed on the display 206 to identify an area in the displayed image where each of the controllable LEDs of the lamp 100 are positioned/intended to emit light onto. This facilitates the user of the user device 200 to interact with the control overlay to control one or more of the controllable LEDs of the LED matrix 104 such that the desired shape (light footprint) can still be projected on the target surface 300.

A marker pattern designates one or more of the controllable LEDs of the LED matrix 104 as a marker. The example source light pattern 302 shown in FIG. 3 illustrates LEDs 308 as markers. The goal of the marker pattern is to provide a basis for putting the control overlay over the captured light pattern.

In one embodiment the controller 102 of the lamp 100 is configured to generate a marker pattern to be projected as part of the source light pattern in response to receiving an illumination pattern (that is transmitted from user device 200) via interface 108. Once the marker pattern is generated, the controller 102 controls the controllable LEDs of the LED matrix 104 in accordance with the received illumination pattern and the generated marker pattern.

Alternatively, the controller 102 may receive a marker pattern via the interface 108 which has been selected at, and transmitted from, the user device 200. The user of the user device 200 is able to interact with the user interface provided by the lighting control software application 214 to select a marker pattern that is to be emitted by the lamp 100. The selected marker pattern defines which of the controllable LEDs of the LED matrix 104 are to be designated as markers. In this embodiment, the lighting control software application 214 may provide one or more predefined marker patterns that the user may select. Alternatively or additionally, the lighting control software application 214 may enable the user to generate a marker pattern themselves by selecting which of the controllable LEDs of the LED matrix 104 are to be designated as a marker using the touch screen 206 and/or the input device 204. Once the marker pattern has been received from the user device 200, the controller 102 controls the controllable LEDs of the LED matrix 104 in accordance with the received illumination pattern and the received marker pattern.

A controllable LED of the LED matrix 104 is identifiable as a "marker" based on one or more characteristics of the light emitted by the particular LED. These characteristics may include a colourpoint (which includes intensity), temporal behaviour (of which coded light is a special case), and spatial properties (multiple marker LED's have a spatial relation).

For example, a marker LED may be identifiable as such based on the colour of visible light emitted by the LED. For example by driving an LED to emit red light, a marker dot may be generated. It will be appreciated that colour (and the specified one at that) is being used merely as an example to illustrate the concept. As is known to persons skilled in the art, visible light has wavelengths between approximately 390 and 700 nanometres (nm).

In another example, a marker LED may emit coded light (where the LED light is modulated with a code) so as to embed an identifier in the light emitted by the LED identifying the particular LED as a marker. Coded light refers to techniques whereby data is embedded in the light emitted by a light source. The light emitted by a marker LED may comprise both a visible illumination contribution for illuminating a target environment such as room (typically the primary purpose of the light), and an embedded signal for providing information into the environment. To do this, the light is modulated at a certain modulation frequency or frequencies, preferably a high enough frequency so as to be beyond human perception and therefore not affecting the primary illumination function. However in some cases, a coded light emitter might not have an illumination function at all, in this case, light not visible to humans (e.g. invisible infra-red light) is used as the medium for transmitting the marker identifying information.

The camera 210 captures an image of the target light pattern that is projected onto the target surface 300 by the lamp 100. The lighting control software application 214 is configured to detect the area on the target surface in the captured image where each of the marker LEDs are positioned/intended to emit light onto.

This detection may be performed automatically by the lighting control software application 214 in response to processing the image captured by the camera 210. In this embodiment, the lighting control software application 214 has access to information stored in memory 212 identifying characteristics of light emitted by the marker LEDs. These characteristics may for example be a colour (e.g. defined by the RGB model) of light emitted by marker LEDs, or an identifier embedded into the light emitted by marker LEDs (e.g. coded light). By processing the image captured by the camera 210 the lighting control software application 214 is able to detect whether light incident on the target surface has these characteristics, and thus detect the areas on the target surface 300 in the captured image where each of the marker LEDs are positioned/intended to emit light onto.

In embodiments where the user of the user device 200 interacts with the user interface provided by the lighting control software application 214 to select a marker pattern that is to be emitted by the lamp 100, the lighting control software application 214 is configured to store information identifying characteristics of light emitted by the marker LEDs in memory 212.

In embodiments where the controller 102 of the lamp 100 is configured to generate the marker pattern, the controller 102 is configured to transmit, via interface 108, information identifying characteristics of light emitted by the marker LED(s) to the user device 200. In response to receiving this information via interface 208, the lighting control software application 214 is configured to store this information in memory 212.

The information stored in memory 212 identifying characteristics of light emitted by the marker LEDs enables the lighting control software application 214 to know what to look out for when processing images captured by the camera 210 in order to identify marker LEDs.

In embodiments, where a marker LED may be identifiable as such based on the colour (or other light characteristic) of visible light emitted by the LED the detection may be performed by the lighting control software application 214 in response to input(s) received by the user of the user device 200 using the touchscreen 206 and/or the input device 204. In these embodiments, the lighting control software application 214 does not perform the detection automatically in response to processing the image captured by the camera 210. For example, in an example scenario whereby marker LEDs are driven to emit red light, the user of the user device 200 may provide inputs (e.g. by touching the touchscreen 206) to indicate where red light is incident on the target surface 300 in the image captured by the camera 210.

Once the lighting control software application 214 detects the area on the target surface in the displayed image (of the target light pattern that is projected onto the target surface 300 by the lamp 100) where each of the marker LEDs are positioned/intended to emit light onto, the lighting control software application 214 is configured to align a control overlay over the displayed image. The displayed control overlay indicates an area on the target surface in the displayed image where each of the controllable LEDs are positioned/intended to emit light onto.

In some embodiments, the lighting control software application 214 displays the image of the target light pattern that it receives from the camera 210 without performing any image processing on it. That is, the lighting control software application 214 does not perform any perspective correction to correct for the distortion in the target light pattern that arises as a result of the position of the lamp 100 and the camera 210 with respect to the target surface 300.

In these embodiments, the lighting control software application 214 uses the marker pattern to adapt the source pattern to form the control overlay. Once the lighting control software application 214 detects the area on the target surface in the displayed image where each of the marker LEDs are positioned/intended to emit light onto (by automatic detection or in response to user inputs) the location of the individual effects of each of the controllable LEDs of the LED matrix 104 can be estimated the lighting control software application 214. The effects of the LEDs that are on (emitting visible light) are visible in the camera 210, so their location in the displayed image can be estimated using known interpolation techniques. By extrapolation, the location of light effects of the LEDs that are turned off (not emitting visible light) can also be estimated. This information is used to skew, stretch and/or resize the source light pattern in order to allow it to be displayed over the imaged target light pattern. Taking the source light pattern 302 as an example which controls a square of 10×10 controllable LEDs to be turned on to emit light, the lighting control software application 214 performs the alignment of the source pattern over the target light pattern 310 in the captured image by adapting the source pattern to ensure that the control overlay indicates the effect of 10 controllable LEDs along the bottom horizontal edge of the distorted light footprint, and indicates the effect of 10 controllable LEDs along the top horizontal edge of the distorted light footprint.

The controller 102 of lamp 100 may control each of the controllable LEDs of the LED matrix 104 to emit coded light so as to embed an identifier in the light emitted by the LED identifying the particular LED. When using a modulation over all of the controllable LEDs, the light contribution from each of the individual controllable LEDs in the target light pattern can be recognized by the lighting control software application 214 and used to form the control overlay.

In other embodiments, no adaption of the source light pattern is performed by the lighting control software application 214 (the source light pattern is used as the control overlay), and the lighting control software application 214 performs image processing on the image captured by the camera 210. That is, the lighting control software application 214 performs perspective correction to correct for the distortion in the target light pattern that arises as a result of the position of the lamp 100 and the camera 210 with respect to the target surface 300. In particular, the marker pattern is used to skew, stretch and/or resize the captured image of the target in order to allow the control overlay (un-adapted source light pattern) of the lamp 100 to be displayed over the imaged target light pattern.

Perspective correction can be seen as the application of a coordination transformation of a camera image. If a shape is known, the transformation can be calculated, and also the inverse transformation can be performed to see how a regular shape looks like in the camera view (like augmented reality). A known target shape like a rectangular piece of paper can be brought in the camera view on the target surface and captured by camera 210. By controlling the LEDs of the LED matrix 104 such that any LEDs is positioned/intended to illuminate an area of the target surface not on the piece of paper are turned off it is possible for the lighting control software application 214 to be aware of how the rectangular shape looks (e.g. distorted) in the camera view as a result of the position of the lamp 100 and the camera 210 with respect to the target surface 300. This enables the lighting control software application 214 insight into the correction methods to use when processing the image captured by the camera 210. It will be appreciated that this can be achieved without placing an object in the view of the camera 210, and instead the lighting control software application 214 may use straight lines and corners in the room geometry for these purposes.

Regardless of how the control overlay is formed, it indicates for each of the controllable LEDs of the of the LED matrix 104, an area on the target surface in the displayed image where each of the controllable LEDs are positioned/intended to emit light onto, by way of an outline surrounding the area.

The user of the user device 200 is able to interact with the control overlay to control one or more of the controllable LEDs of the LED matrix 104 by selection of one or more of the outlines (areas) of the control overlay that correspond to the one or more of the controllable LEDs. This selection can be performed using the touch screen 206 and/or the input device 204. These user inputs are communicated from the user device via interface 208 to the lamp 100 to control the LED matrix 104. Thus irrespective of the distortion and the camera's view point it is possible to correct the distortion with simple user input(s).

The control overlay enables a user to determine the shape of the spot (light footprint) on the target surface 300, to adjust the intensity distribution of the controllable LEDs of the LED matrix 104 or to identify only particular places on the target surface 300 which are to be lit. This is described in more detail with reference to FIGS. 4-6.

Figure 4:
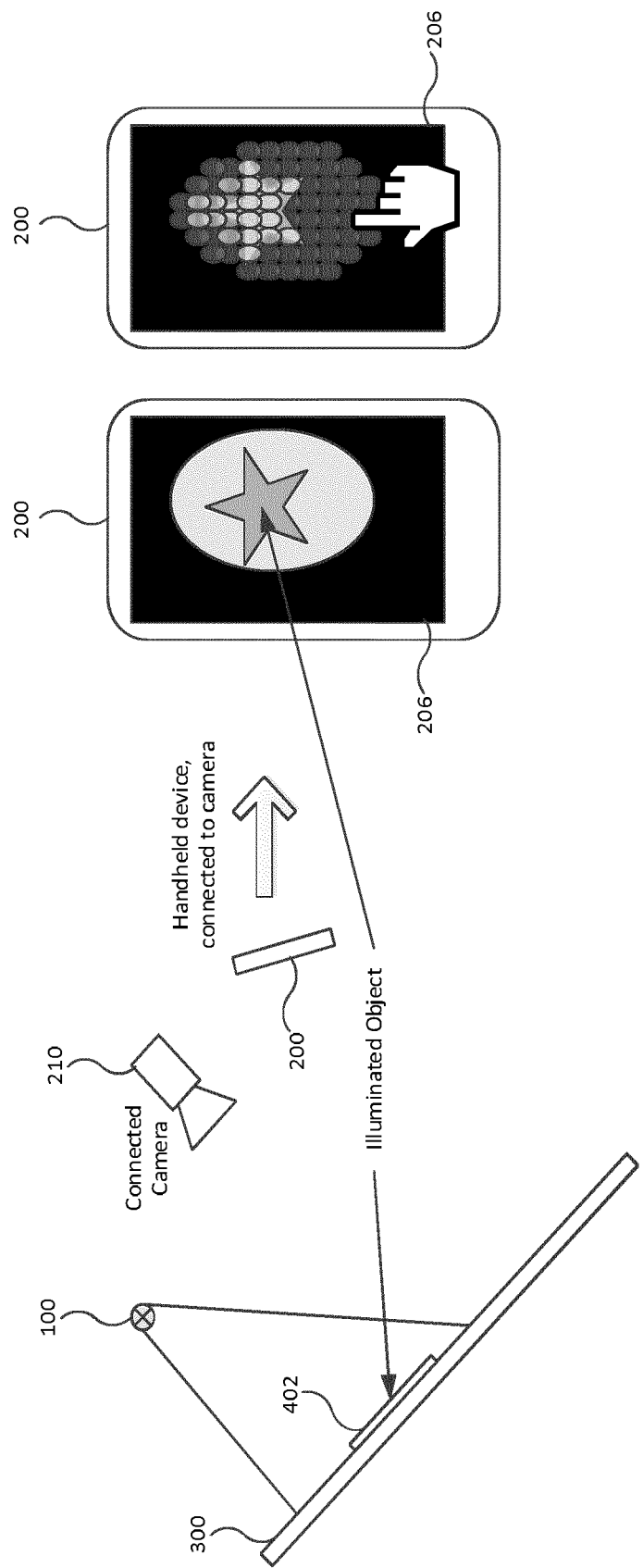
FIG. 4 illustrates interaction by a user with a user interface provided by the lighting control software application executed on the user device.

FIG. 4 illustrates a scenario whereby the lamp 100 is arranged to illuminate a star-shaped object 402 that is positioned on target surface 300.

As shown in the image captured by the camera 210, the lamp 100 provides an oval-shaped illumination around the object 402. When the user wants light to projected on the star-shaped object 402 only (not the surrounding area) the user of the user device 200 can provide individual controllable LEDs of the LED matrix 104 can be addressed and controlled to create a desired light pattern.

The user interface provided by the lighting control software application 214 may enable this in various ways.

The user interface provided by the lighting control software application 214 may enable a user to turn off (or dim down) the controllable LEDs that are positioned/intended to not emit light onto the star-shaped object 402 by selecting the outlines of the control overlay that correspond to each of these controllable LEDs. Rather than addressing each controllable LED in turn, the user interface provided by the lighting control software application 214 may enable a user to draw a closed shape on the user interface using the touch screen 206 and/or the input device 204, and the lighting control software application 214 may be configured to control the LEDs that are position to emit light within this shape to be switched off (or dimmed down).

The user interface provided by the lighting control software application 214 may enable a user to draw a closed shape around the star-shaped object 402 displayed in the user interface using the touch screen 206 and/or the input device 204, and the lighting control software application 214 may be configured to control the LEDs that are positioned/intended to emit light within this shape to remain turned on, and control the remaining LEDs that are not positioned/intended to emit light within this shape to be turned off (or dimmed down).

Finally, the user interface provided by the lighting control software application 214 may enable a user to drag a predefined closed target shape (e.g. circle, rectangle, triangle etc.) over the displayed light effect in the display to control the light emitted by the controllable LEDs. In embodiments whereby no adaption of the source light pattern is performed by the lighting control software application 214 (the source light pattern is used as the control overlay), and the lighting control software application 214 performs image processing on the image captured by the camera 210, a transformation matrix has to be determined and the inverse transformation is used to predict how the predefined closed target shape would look like in the camera view (due to the distortion). This transformed shape is placed over the control overlay by the lighting control software application 214 in order to determine which of the controllable LEDs to turn on/off in order to obtain the light effect with the regular shape.

Depending on the complexity of the desired light effect projected on the target surface 300, the user will need to provide different amount of input before the desired light effect is achieved.

To illustrate this further, reference is now made to FIG. 5 and FIGS. 6a-c.

Figure 5:
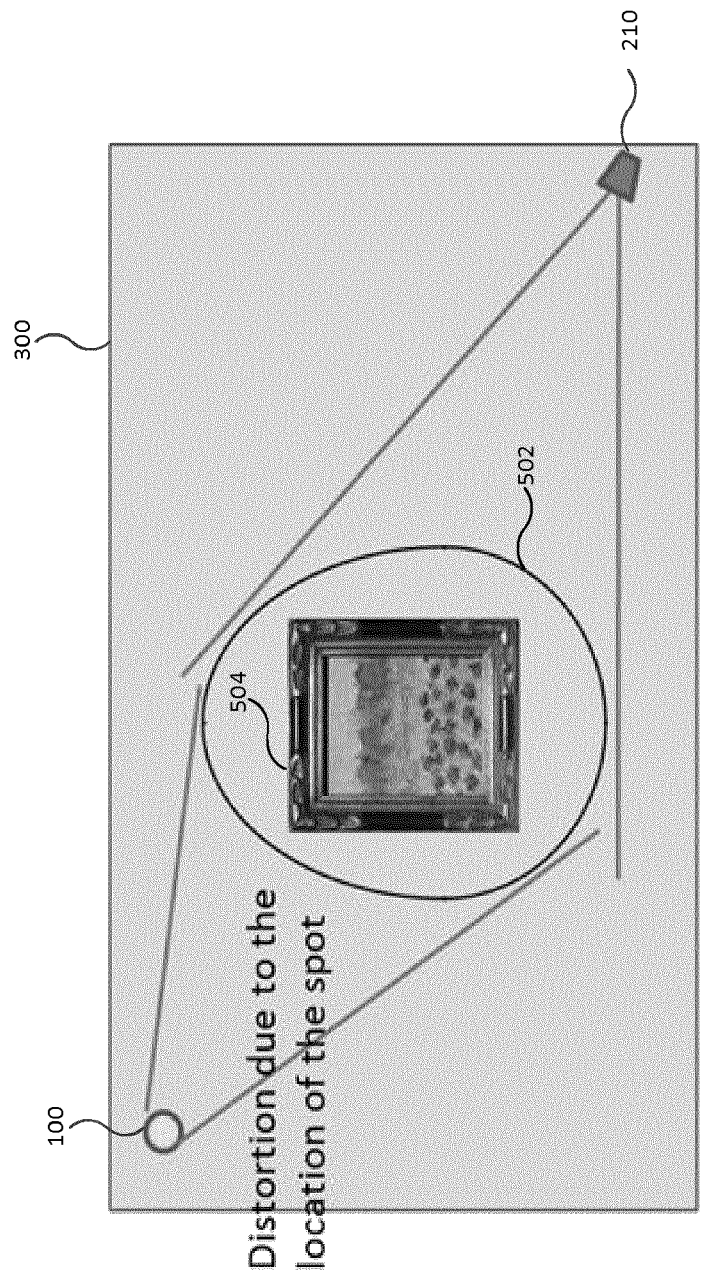
FIG. 5 illustrates a distorted area of illumination that is projected on a target surface.

FIG. 5 illustrates a scenario whereby the lamp 100 is arranged to emit light in accordance with a source light pattern onto an object 504 (a painting in the example of FIG. 5) that is positioned on target surface 300. Due to the location of the lamp 100, the lamp 100 provides a distorted area of illumination 502 around the object 504.

Figure 6C:
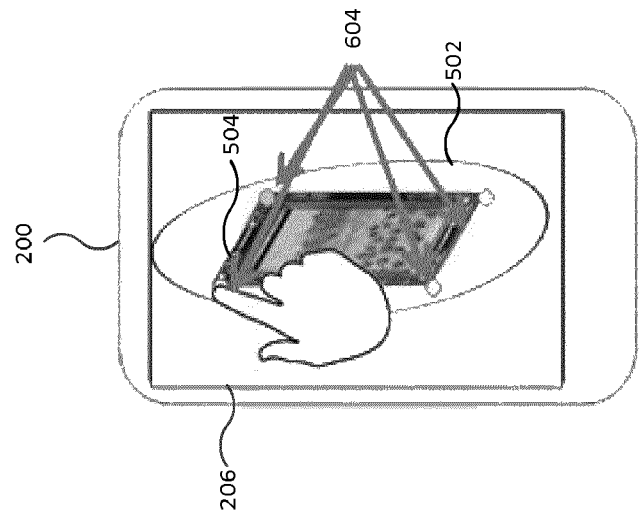
FIGS. 6a-c illustrates interaction by a user with the user interface provided by the lighting control software application executed on the user device.
Figure 6B:
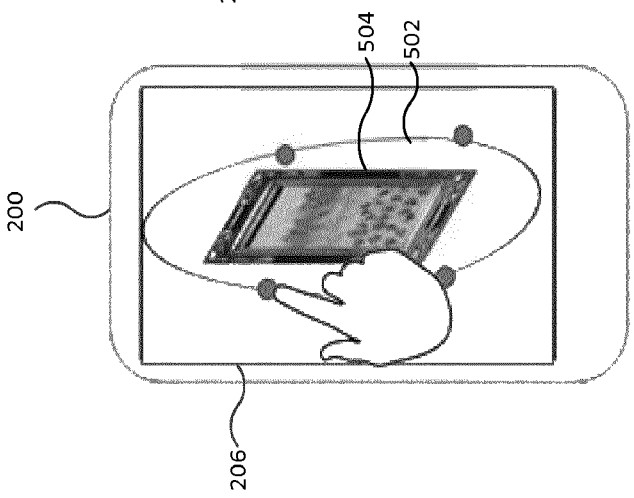
Figure 6A:
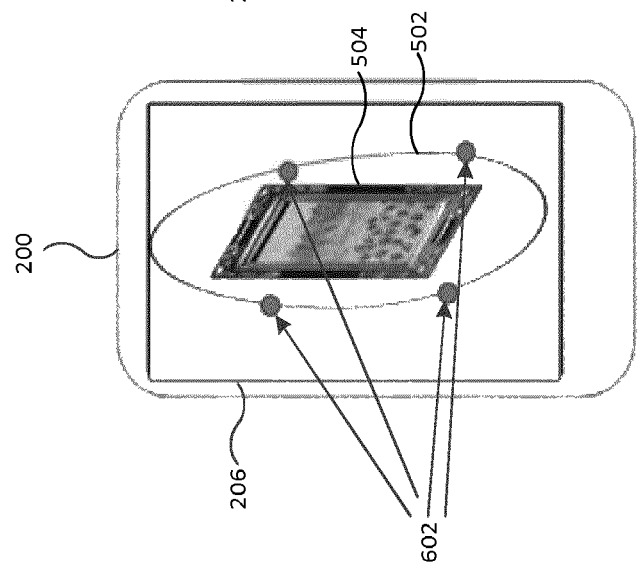

FIG. 6a illustrates that a marker pattern 602 has been projected as part of the source light pattern in which marker LEDs are driven to emit coloured light (e.g. red). A user is able to select the areas on the target surface 300 in the captured image where the marker LEDs are positioned/intended to emit light onto, and the lighting control software application 214 is configured to detect these area in response to these selections. This is illustrated in FIG. 6b.

After this, the camera view can be frozen to avoid misalignment due to user's hand movements (applicable when the camera 210 is integrated into the user device 200).

The lighting control software application 214 is configured to align a control overlay over the displayed image. The displayed control overlay indicates an area on the target surface in the displayed image where each of the controllable LEDs are positioned/intended to emit light onto.

The user interface provided by the lighting control software application 214 enables a user to draw a closed shape around the object 504 displayed in the user interface using the touch screen 206 and/or the input device 204, and the lighting control software application 214 may be configured to control the LEDs that are positioned/intended to emit light within this shape to remain turned on, and control the remaining LEDs that are not positioned/intended to emit light within this shape to be turned off (or dimmed down).

For example a user will only need to indicate four locations 604 of the control overlay for the lighting control software application 214 to calculate how to control the controllable LEDs of the LED matrix 104 such to only illuminate the object 504. This irrespective of the distortion and the user's camera view embodiments of the present disclosure enable a creation of a desired light effect with limited user inputs.

Whilst FIG. 6c only illustrates the selected locations 604 of the control overlay, it will be appreciated that the control overlay will visually indicate where each of the LEDs are positioned/intended to emit light onto.

It will be appreciated that if the target surface 300 is not flat this presents difficulties in the detection by the lighting control software application 214 of the areas on the target surface 300 in the captured image where each of the marker LEDs are positioned/intended to emit light onto and thus the display of the control overlay. For example, if the target surface 300 has holes through light can pass through and a marker LED is positioned/intended to emit light through the hole, this will prevent the detection of the marker LED by the lighting control software application 214.

The number of marker dots can vary depending on the target surface 300, e.g. if the target surface 300 is not flat the user of the user device 200 is able to input this information into the user interface provided by the lighting control software application 214.

In embodiments wherein the controller 102 of the lamp 100 is configured to generate a marker pattern to be projected as part of the source light pattern in response to receiving an illumination pattern, in response to receiving an indication that the target surface 300 is not flat the lighting control software application 214 is configured to supply this information to the lamp 100. In response to receiving this information (that is transmitted from user device 200) via interface 108, the controller 102 of the lamp 100 is configured to designate more controllable LEDs as markers than it would otherwise for a flat target surface.

In embodiments wherein the user of the user device 200 is able to interact with the user interface provided by the lighting control software application 214 to select a marker pattern that is to be emitted by the lamp 100, in response to receiving an indication that the target surface 300 is not flat, the lighting control software application 214 is configured to designate more controllable LEDs as markers than selected by the user, and transmit the modified marker pattern via interface 208 to the lamp 100

Whilst FIG. 3 has been described with reference to a scenario whereby the lamp 100 is not perpendicular to the target surface 300 and the camera 210 is perpendicular to the target surface 300. It will be appreciated that in another scenario the lamp 100 may be perpendicular to the target surface 300, but the camera 210 may not be perpendicular to the target surface 300. Furthermore, in another scenario both the lamp 100 and the camera 210 may not be perpendicular to the target surface 300. In both of these scenarios, the light effect (which is rectangular at the source) incident on the target surface 300 in an image captured by the camera 210 will not be rectangular. Embodiments of the present disclosure extend to enabling the user of the user device 100 to control the controllable LEDs of the of the LED matrix 104 despite this distortion.

It will be appreciated that the above embodiments have been described only by way of example.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The terms "controller" and "application" as used herein generally represent software, firmware, hardware, or a combination thereof. In the case of a software implementation, the controller, or application represents program code that performs specified tasks when executed on a processor (e.g. CPU or CPUs). The program code can be stored in one or more computer readable memory devices. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A user device comprising:
   a display;
   an interface for communication with a lamp comprising a plurality of controllable light sources;
   a processor configured to run an application for controlling the lamp, wherein the application is configured to:
   control the lamp to emit light in accordance with a source light pattern, said source light pattern defining for each light source from the plurality of controllable light sources the light that is to be emitted by the light source and designating at least one of the plurality of controllable light sources as a marker light source;
   receive an image of the source light pattern as projected onto a target surface by the lamp, wherein the image is captured by a camera coupled to the processor;
   display the image on the display;
   detect in the displayed image locations where the at least one marker light source emits light onto the target surface;
   use the detected locations of the at least one marker light source in the displayed image of the source light pattern as projected onto the target surface to align a control overlay over the displayed image, the control overlay identifying, for each of the plurality of controllable light sources of the lamp, an area in the displayed image where the light source is intended to emit light onto by an outline surrounding said area, wherein the control overlay enables a user of the user device to individually control the plurality of light sources of the lamp in response to at least one user selection of one or more of the outlines;
   a memory to store characteristics of light emitted by the at least one marker light source; and
   wherein the detected locations are detected by detecting light incident on said locations that have characteristics corresponding to characteristics of light emitted by the at least one marker light source stored in the memory of the user device.

2. The user device according to claim 1, wherein the application is configured to control the lamp to emit light in accordance with the source light pattern by transmission of an illumination pattern to the lamp via said interface, the illumination pattern defining for each controllable light source, the light that is to be emitted by the light source.

3. The user device according to claim 1, wherein the application is configured to control the lamp to emit light in accordance with the source light pattern by transmission of a marker pattern to the lamp via said interface, the marker pattern designating at least one of the controllable light sources as a marker light source.

4. The user device according to claim 2, wherein the application is configured to receive via said interface a marker pattern transmitted from the lamp, the marker pattern generated by the lamp and designating at least one of the controllable light sources as a marker light source.

5. The user device according to claim 1, wherein the source light pattern as projected onto a target surface by the lamp and captured by the camera in the displayed image is distorted, and the application is configured to form the control overlay by adapting the source light pattern such that the control overlay outlines the distorted source light pattern.

6. The user device according to claim 1, wherein the control overlay corresponds to the source light pattern, and the application is configured to perform image processing on the received image to generate a processed image having said distortion corrected and display the processed image such that the source light pattern is aligned over the processed image.

7. The user device according to claim 1, wherein the application is configured to receive a user selection of an area of the control overlay, and transmit a command via said interface to the lamp to control the light source positioned to emit light onto said area.

8. The user device according to claim 1, wherein the display comprises a touchscreen arranged to receive said user selection.

9. The user device according to claim 1, wherein the user device comprises a user input device for receiving said user selection.

10. A lighting system comprising:
the user device according to claim 1; and
the lamp.

11. A computer-readable, non-transitory medium having stored therein instructions for causing a processor of a user device unit to execute a method for controlling a lamp comprising controllable light sources, wherein the user device comprising a display and an interface for communication with the lamp, the medium comprising code to:
control the lamp to emit light in accordance with a source light pattern, said source light pattern defining for each controllable light source the light that is to be emitted by the light source, and designating at least one of the controllable light sources as a marker light source;
receive an image of the source light pattern that is projected onto a target surface by the lamp that is captured by a camera coupled to the processor, wherein the source light pattern in the image is distorted;
display an image on the display;
detect locations on the target surface in the displayed image that the at least one marker light source are positioned to emit light onto; and
use the detected locations to align a control overlay over the displayed image, the control overlay identifying, for each of the controllable light sources, an area in the displayed image where the light source is positioned to emit light onto by an outline surrounding said area, wherein the control overlay enables a user of the user device to control the light sources in response to at least one user selection of one or more of the outlines; and
detect the locations on the target surface in the displayed image that the at least one marker light source are positioned to emit light onto by detecting that light incident on said locations have characteristics corresponding to characteristics of light emitted by the at least one marker light source stored in a memory of the user device.

12. A method implemented at a user device for controlling a lamp comprising controllable light sources, the method comprising:
controlling the lamp to emit light in accordance with a source light pattern, said source light pattern defining for each controllable light source the light that is to be emitted by the light source, and designating at least one of the controllable light sources as a marker light source;
receiving an image of the source light pattern that is projected onto a target surface by the lamp that is captured by a camera of the user terminal, wherein the source light pattern in the image is distorted;
displaying an image on a display of the user device;
detecting locations on the target surface in the displayed image that the at least one marker light source are positioned to emit light onto; and
using the detected locations to align a control overlay over the displayed image, the control overlay identifying, for each of the controllable light sources, an area in the displayed image where the light source is positioned to emit light onto by an outline surrounding said area, wherein the control overlay enables a user of the user device to control the light sources in response to at least one user selection of one or more of the outlines; and
detecting the locations on the target surface in the displayed image that the at least one marker light source are positioned to emit light onto by detecting that light incident on said locations have characteristics corresponding to characteristics of light emitted by the at least one marker light source stored in a memory of the user device.

13. The method according to claim 12, wherein the characteristics comprise an identifier of the at least one marker light source that is embedded in light emitted by the at least one marker light source or a colour of light emitted by the at least one marker light source.

14. A method implemented at a user device for controlling a lamp comprising controllable light sources, the method comprising:
controlling the lamp to emit light in accordance with a source light pattern, said source light pattern defining for each controllable light source the light that is to be emitted by the light source, and designating at least one of the controllable light sources as a marker light source;
receiving an image of the source light pattern that is projected onto a target surface by the lamp that is captured by a camera of the user terminal, wherein the source light pattern in the image is distorted;
displaying an image on a display of the user device;
detecting locations on the target surface in the displayed image that the at least one marker light source are positioned to emit light onto;
using the detected locations to align a control overlay over the displayed image, the control overlay identifying, for each of the controllable light sources, an area in the displayed image where the light source is positioned to emit light onto by an outline surrounding said area, wherein the control overlay enables a user of the user device to control the light sources in response to at least one user selection of one or more of the outlines; and
wherein the at least one marker light source are controlled to emit coloured light, and the method further comprises detecting the locations on the target surface in the displayed image that the at least one marker light source are positioned to emit light onto based on at least one input received from a user of the user device identifying the locations on the target surface in the displayed image at which the coloured light is incident on.

15. A user device comprising:
a display;
an interface for communication with a lamp comprising a plurality of controllable light sources;
a processor configured to run an application for controlling the lamp, wherein the application is configured to:
control the lamp to emit light in accordance with a source light pattern, said source light pattern defining for each light source from the plurality of controllable light sources the light that is to be emitted by the light source and designating at least one of the plurality of controllable light sources as a marker light source;
receive an image of the source light pattern as projected onto a target surface by the lamp, wherein the image is captured by a camera coupled to the processor;
display the image on the display;
detect in the displayed image locations where the at least one marker light source emits light onto the target surface; and use the detected locations of the at least one marker light source in the displayed image of the source light pattern as projected onto the target surface to align a control overlay over the displayed image, the control overlay identifying, for each of the plurality of controllable light sources of the lamp, an area in the displayed image where the light source is intended to emit light onto by an outline surrounding said area, wherein the control overlay enables a user of the user device to individually control the plurality of light sources of the lamp in response to at least one user selection of one or more of the outlines;

wherein the at least one marker light source are controlled to emit coloured light, and the method further comprises detecting the locations on the target surface in the displayed image that the at least one marker light source are positioned to emit light onto based on at least one input received from a user of the user device identifying the locations on the target surface in the displayed image at which the coloured light is incident on.

\* \* \* \* \*